United States Patent [19]
Nassehi et al.

[11] Patent Number: 5,185,737
[45] Date of Patent: Feb. 9, 1993

[54] METHOD AND APPARATUS FOR CYCLIC RESERVATION MULTIPLE ACCESS IN A COMMUNICATIONS SYSTEM

[75] Inventors: Mehdi M. Nassehi, Adliswil; Erwin A. Zurfluh, Feldmeilen, both of Switzerland

[73] Assignee: International Business Machines Corporation, Armonk, N.Y.

[21] Appl. No.: 491,902

[22] Filed: Mar. 12, 1990

[30] Foreign Application Priority Data

Apr. 21, 1989 [EP] European Pat. Off. ........... 89810229

[51] Int. Cl.$^5$ ............................................. H04J 3/16
[52] U.S. Cl. .................. 370/85.8; 370/85.15
[58] Field of Search .................. 370/85.1, 85.2, 85.4, 370/85.5, 85.6, 85.7, 85.8, 85.9, 85.12, 85.15, 95.2

[56] References Cited

U.S. PATENT DOCUMENTS

| | | | |
|---|---|---|---|
| 4,536,873 | 8/1985 | Leete | 370/85.15 |
| 4,718,061 | 1/1988 | Turner | 370/85.15 |
| 4,7671,780 | 8/1988 | Bingham et al. | 370/85.15 |

FOREIGN PATENT DOCUMENTS

| | | |
|---|---|---|
| 2162722 | 2/1986 | United Kingdom . |
| 8603639 | 6/1986 | World Int. Prop. O. . |

OTHER PUBLICATIONS

John L. Hullett and Peter Evans, "New Proposal extends the reach of metro area nets", Data Communications, vol. 17, No. 2, Feb. 1988, pp. 139-147.

Primary Examiner—Douglas W. Olms
Assistant Examiner—Meluin Marcelo
Attorney, Agent, or Firm—Joscelyn G. Cockburn

[57] ABSTRACT

In a communications network comprising two counter-flowing busses (folded bus or dual bus) and a number of stations (N1, N2, N3) connected between them, a cyclic reservation and access technique is provided. A headend unit generates consecutive time slots for data transmission which are grouped in cycles. For each cycle, the headend first issues a reservation command (RES) with a cycle number and a reservation count which each station augments by the slot count required locally. Each station stores the cycle number with the requested slot count. The headend stores in a global reservation queue, for each returning reservation command, the cycle number and the accumulated reservation count. Later it issues a start command (ST) with the respective cycle number, and subsequently generates the required number of slots as indicated by the stored accumulated reservation count. The headend can issue additional confirm commands and reject commands for activating a backpressure mechanism.

24 Claims, 12 Drawing Sheets

FIG. 5

SLOTS LEAVING HEADEND STATION ON OUTBOUND BUS

| MAC CMD | | SEGMENT |
|---|---|---|
| START | (12) | — |
| RES 1 | [25] | — |
| RES 2 | "000" | — |
| RES 3 | "000" | — |
| XXX | | — |
| XXX | | — |

| MAC CMD | | SEGMENT |
|---|---|---|
| START | (13) | — |
| RES 1 | [26] | — |
| RES 2 | "000" | — |
| RES 3 | "000" | — |
| XXX | | — |

SLOTS RETURNING TO HEADEND STATION ON INBOUND BUS

| MAC CMD | | SEGMENT |
|---|---|---|
| START | (12) | N 15 (11) |
| RES 1 | [25] | N 2 (12) |
| RES 2 | "187" | N 4 (12) |
| RES 3 | "000" | N 4 (12) |
| XXX | | N 4 (12) |
| XXX | | N 7 (12) |

| MAC CMD | | SEGMENT |
|---|---|---|
| START | (13) | N 11 (12) |
| RES 1 | [26] | N 1 (13) |
| RES 2 | "228" | N 1 (13) |
| RES 3 | "013" | N 2 (13) |
| XXX | | N 7 (13) |

EXAMPLE:
Ni (12) = DATA FROM STATION Ni FOR CYCLE 12

RESERVE(PRI,CYCLE#,LENGTH)
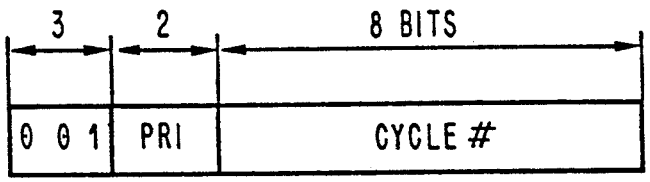
FIG. 6A
RES 1
FIG. 6B
RES 2
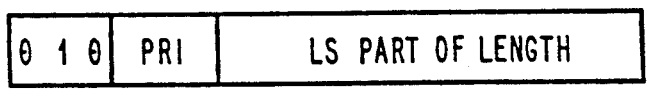
FIG. 6C
RES 3
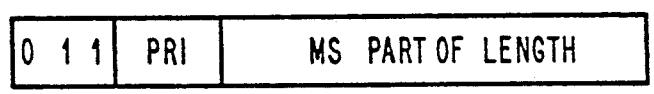
FIG. 6D
CONFIRM (PRI,CYCLE#)
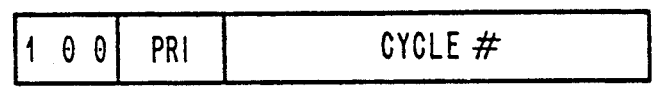
FIG. 6E
START (PRI,CYCLE#)
FIG. 6F
REJECT (PRI)
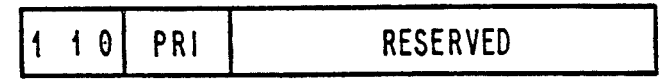
FIG. 6G
RECOVERY(PRI,ACTION)
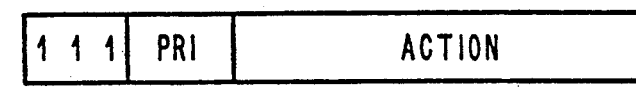
FIG. 6H
NOOP

METHOD AND APPARATUS FOR CYCLIC RESERVATION MULTIPLE ACCESS IN A COMMUNICATIONS SYSTEM

FIELD OF INVENTION

Present invention is concerned with access to the transmission medium in a communications network comprising a unidirectional bus structure in a folded-bus or a dual-bus configuration and a plurality of stations connected between the busses, and in particular to a method and apparatus for regulating access to the transmission on the basis of a cyclic reservation technique.

BACKGROUND

Several kinds of networks are known in which plural nodes or stations gain access to a common transmission medium. Examples of such systems are single bus networks with collision detection, and token ring networks as well as token passing bus networks. Recently, networks providing another technique of multiple access to a common transmission medium have become of interest. These are systems comprising two parallel busses with counterflowing transmission of information of the two busses. Slots are released at regular intervals by headend stations, and these slots are used by the node stations for data transmission. Each node station has to request access to a slot by previously transmitting an access request in an Access Control Field of a passing slot. It keeps a count of access requests it has seen from other, stations (located upstream in request transmission direction) before it raises its own access request, and lets as many free slots pass by (for use by the other stations) as the count indicated, before it occupies the next free slot for transmission of its own data.

Such systems were described e.g. in a paper by R. M. Newman et al. entitled "The QPSX MAN", published in the IEEE Communications Magazine, Vol. 26 No. 4 (April 1988) pp.20–28; and in a Draft Proposed IEEE Standard 802.6 entitled "Distributed Queue Dual Bus (DQDB) Metropolitan Area Network (MAN)", Draft D6, Nov. 15, 1988.

Though these known distributed queueing systems are well suited for networks comprising a limited number of stations, they have some disadvantages which become unacceptable and may render the system inefficient when the number of stations is raised to several hundred, and when the length of the transmission busses is in the order of several kilometers.

These disadvantages are in particular: An "unfairness" for some stations with respect to others, due to the fact that each station has to await a free access request field before it can transmit a request, so that stations located upstream (in request transmission direction) are preferred; and an impossibility to guarantee the availability of a sequence of consecutive slots for one station desiring to transmit the portions of data packet without interruption.

In an article by S. B. Calo et al.: "Poll Actuated Multiple Access Technique for Broadgathering Systems", IBM Technical Disclosure Bulletin, Vol. 30, No. 1 (June 1987) pp. 72–75, a dual system is disclosed which has a plurality of stations connected between the busses. For controlling access to the busses, a pacer is provided at one end and a poller at the other end of the network. The pacing element partitions the time into contiguous slots which can be used by stations for data transmission. The polling element imposes a frame cycle structure by starting operation cycles. Each station can use only a limited number of slots in any cycle.

This method avoids the possibility that particular stations because of their topological situation can dominate the system (not leaving free slots for other stations). However, it has also disadvantages. As the allowed number of slots for each station is fixed or determined by central administration, situations may often occur that in a cycle a heavily active station cannot transmit as many slots as required, whereas momentarily silent stations will not use any slots of a cycle. This will result in a non-optimum utilization of the transmission network.

OBJECTS OF THE INVENTION

It is an object of the invention to provide a multiple access method and apparatus for a bus communications network, which allows a fair treatment of all stations according to their current need, independent of their location in the system.

It is another object to provide a multiple access method and apparatus which, based on previous access requests by stations, guarantees to each station the necessary accesses to the transmission medium within reasonable time.

Another object of the invention is to provide a multiple access technique for stations attached to a network of counterflowing, unidirectional busses, by which the access is adapted exactly and individually to the current needs of each station, and which guarantees a fair treatment to each station.

A further object of the invention is to provide a multiple access technique for a communications network of counterflowing unidirectional busses, which guarantees to each station the availability of a sequence of consecutive free slots when the respective number of slots have been requested previously at one time.

SUMMARY OF THE INVENTION

These objects are achieved by access regulation methods for a communications network as defined in claims 1 and 8. Apparatus for multiple access requests in a communication system, which attains these objects, is defined in claim 14. Preferred particular embodiments of these methods and apparatus are defined in the dependent claims.

The invention achieves the objects mainly by providing particular medium access commands and a specific cyclic reservation and access technique using local as well as global reservation queues.

An advantage of present invention is that it allows an optimum utilization of the transmission network even with substantially varying transmission needs of the individual stations. Achievement of full throughput efficiency is independent of the speed-distance product of the network.

A further advantage is that a single station or a few stations can utilize the full network capacity in situations where other stations have no transmission requests.

Another advantage of the invention is that it allows to apply a backpressure mechanism that will cause a slowing down of the rate of access requests in overload situations, affecting each station in accordance with its present transmission needs.

A further advantage is that the multiple access technique can be used separately for each one of several priority levels.

Furthermore, in a system using the invention all global control information is centralized in headend units. Thus, inconsistency problems of the case when that information is replicated are avoided. Also, the nodal states contain only local information, avoiding the need of state acquisition by newly activated node stations.

These and other advantages will become more apparent from the following description of a preferred embodiment of the invention with reference to the drawings.

LIST OF DRAWINGS

Figure 7:
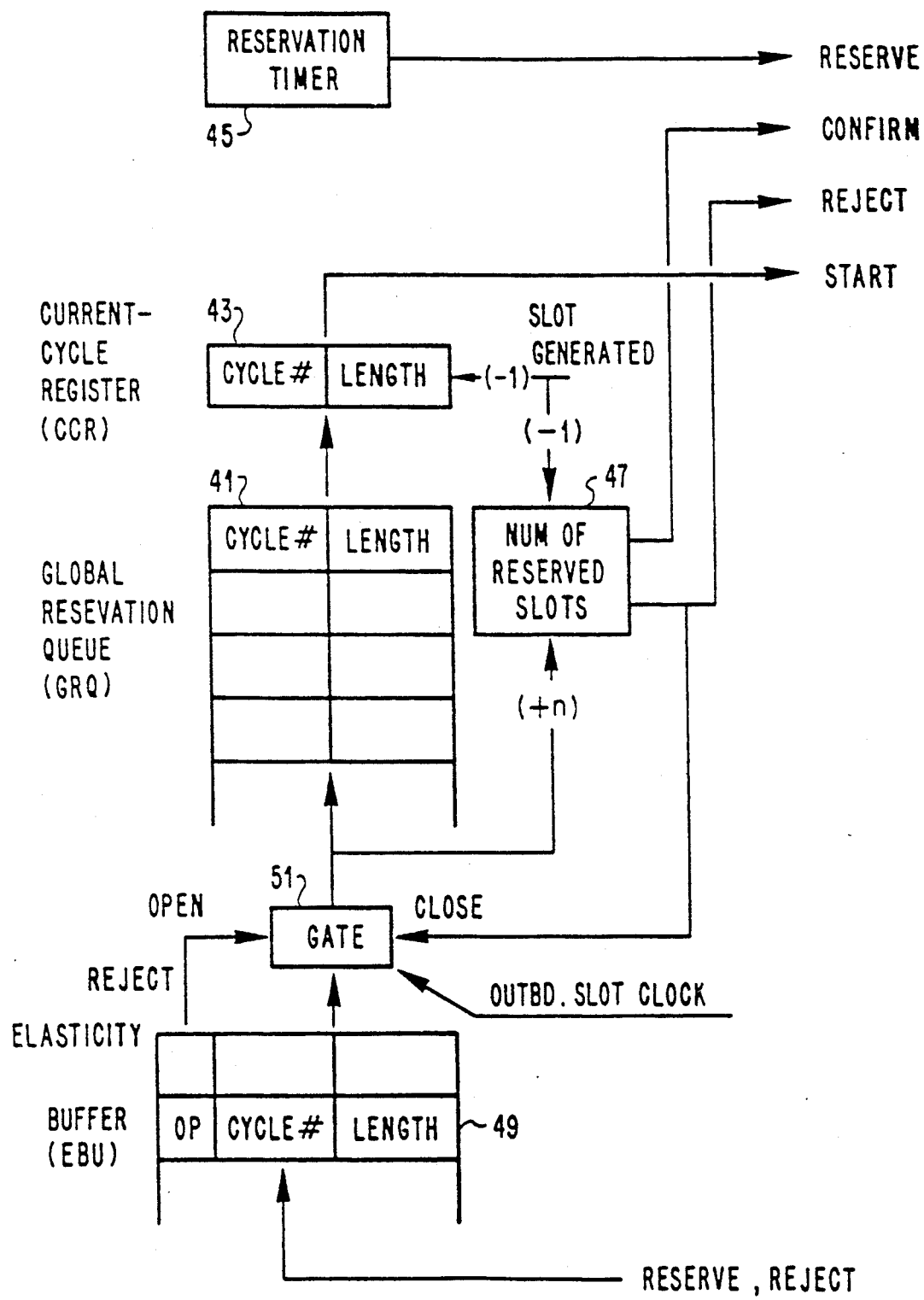
Figure 8:
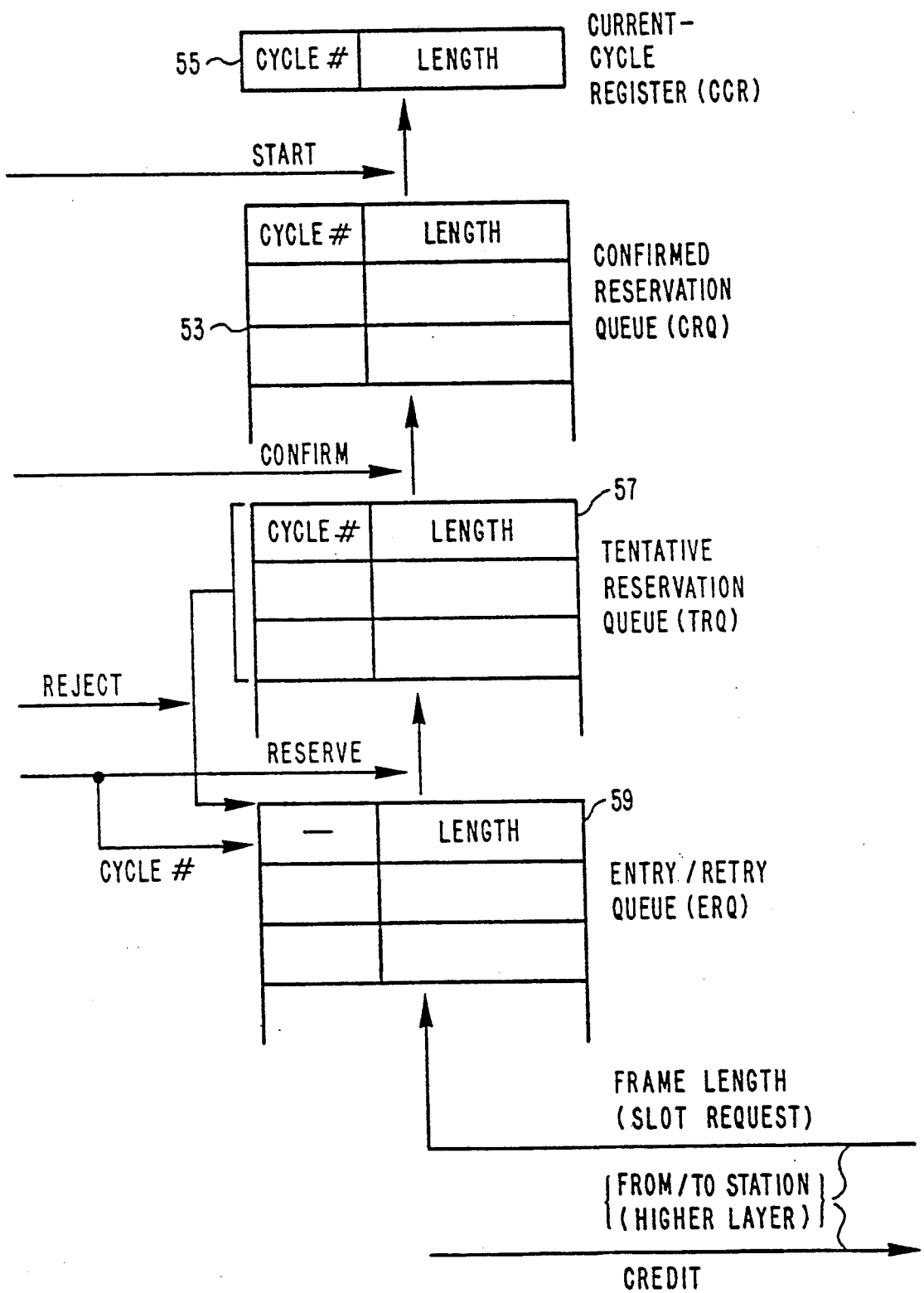
Figure 9:
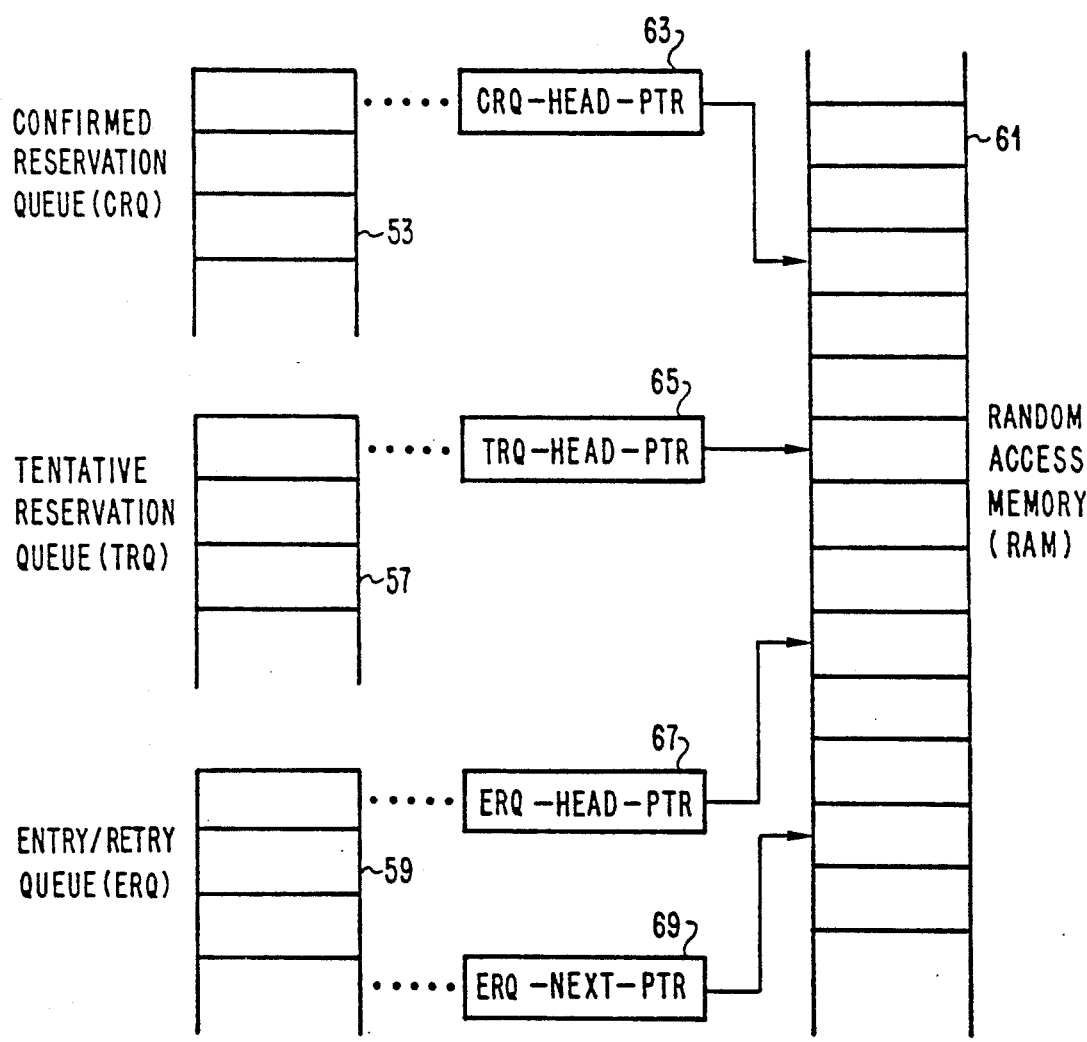
Figure 10:
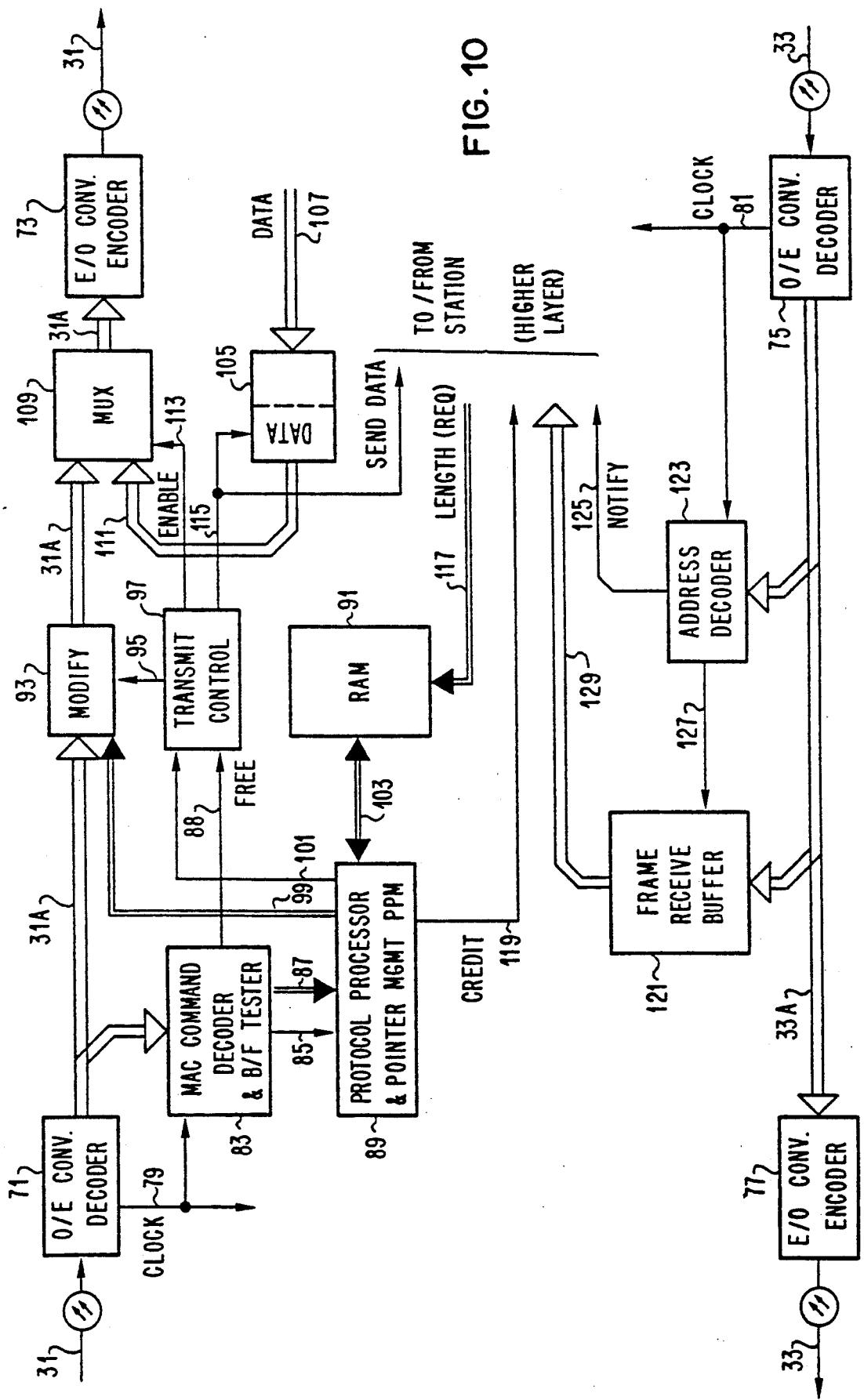
Figure 11:
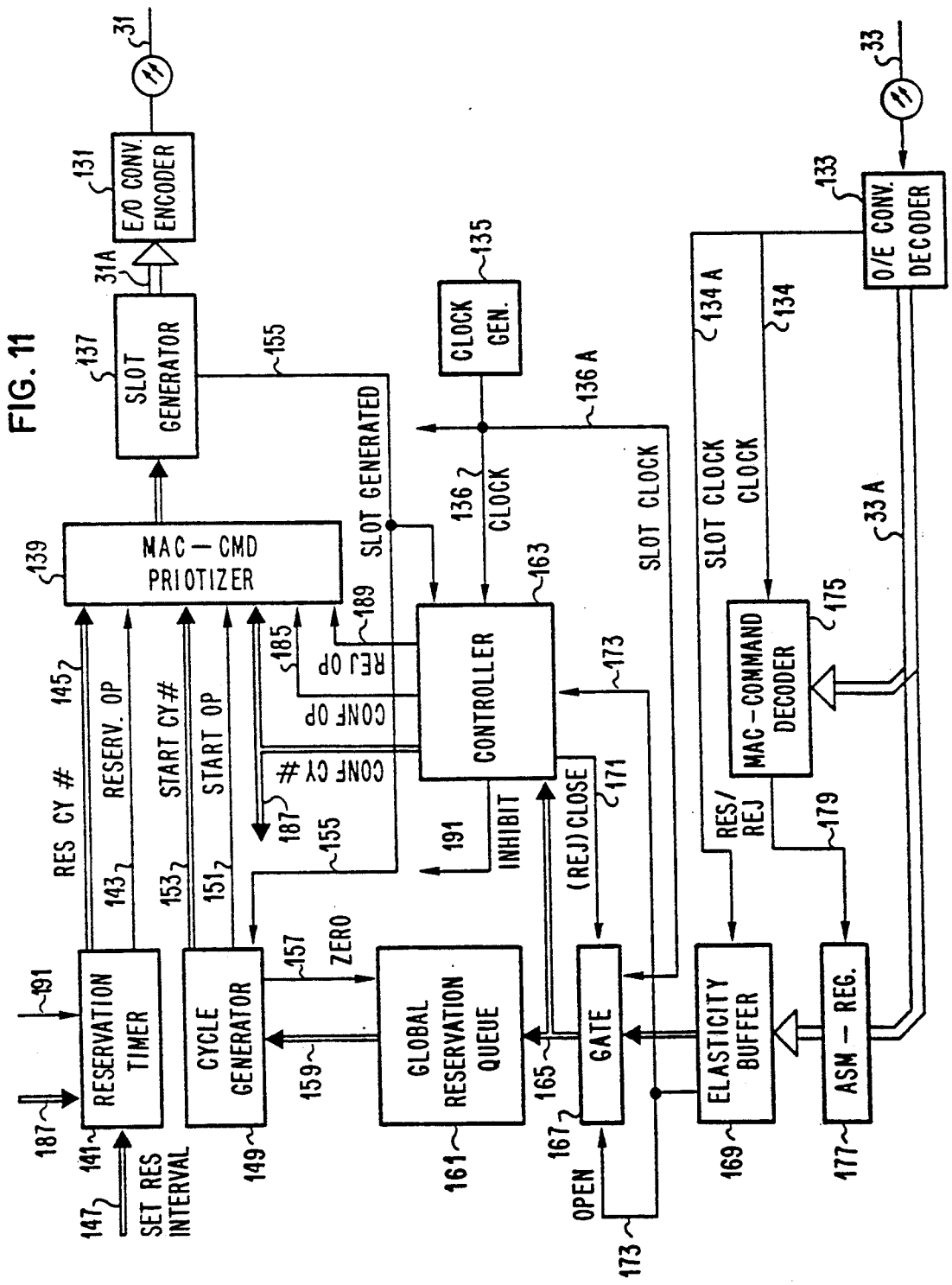
Figure 12:
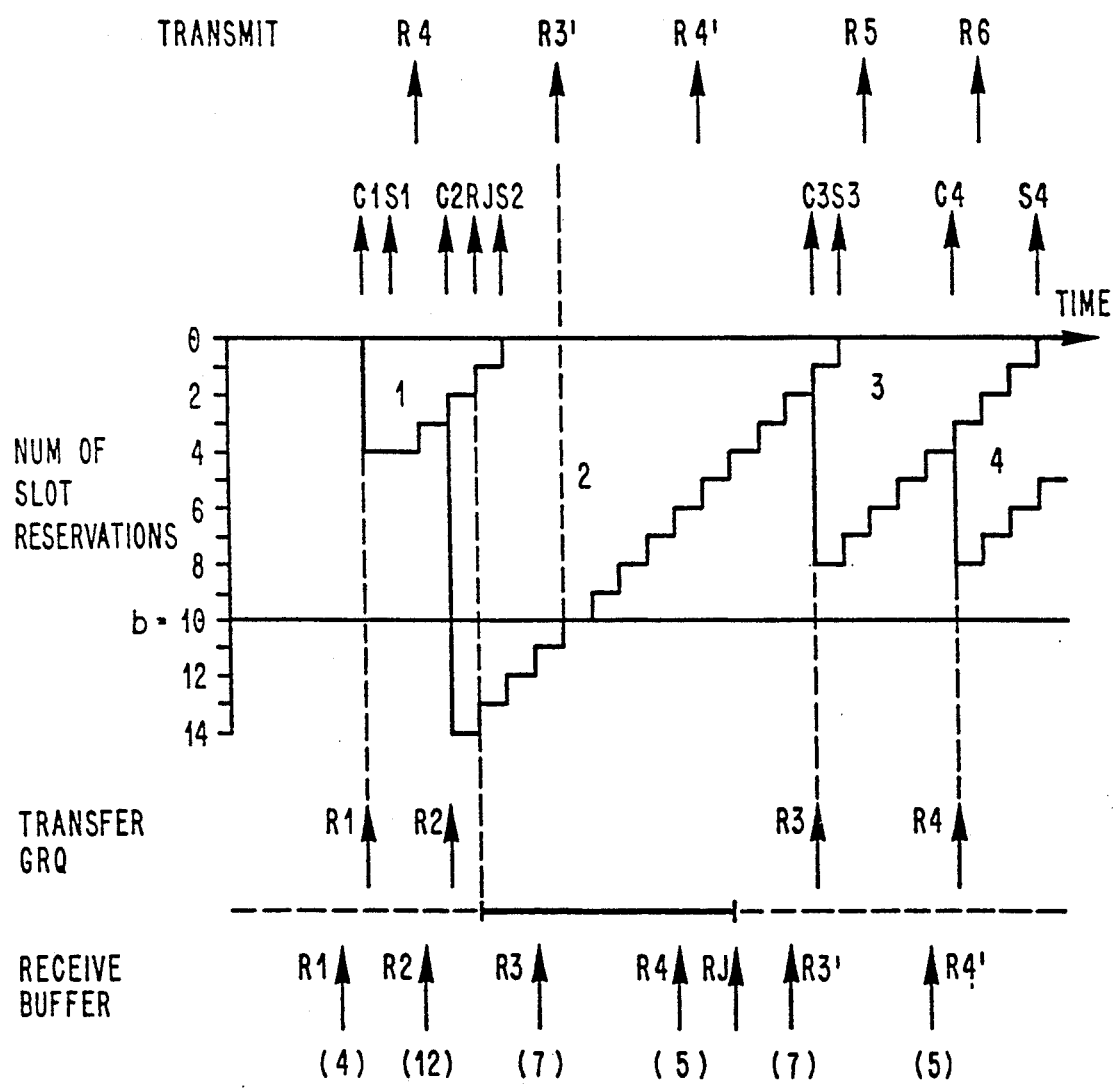
Figure 13A:
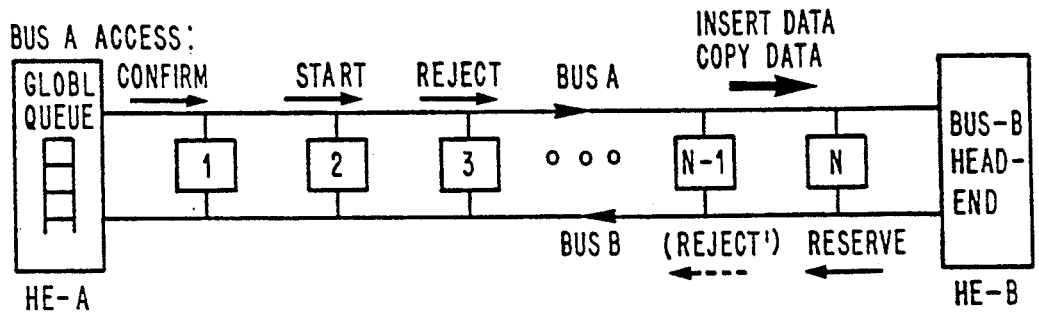
Figure 13B:
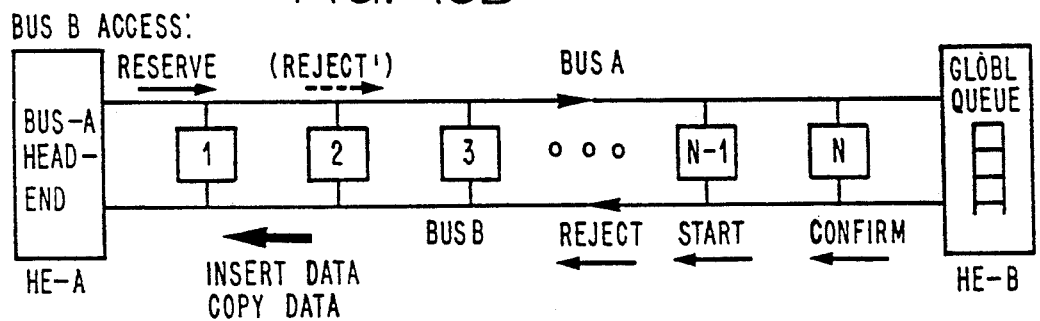
Figure 14:
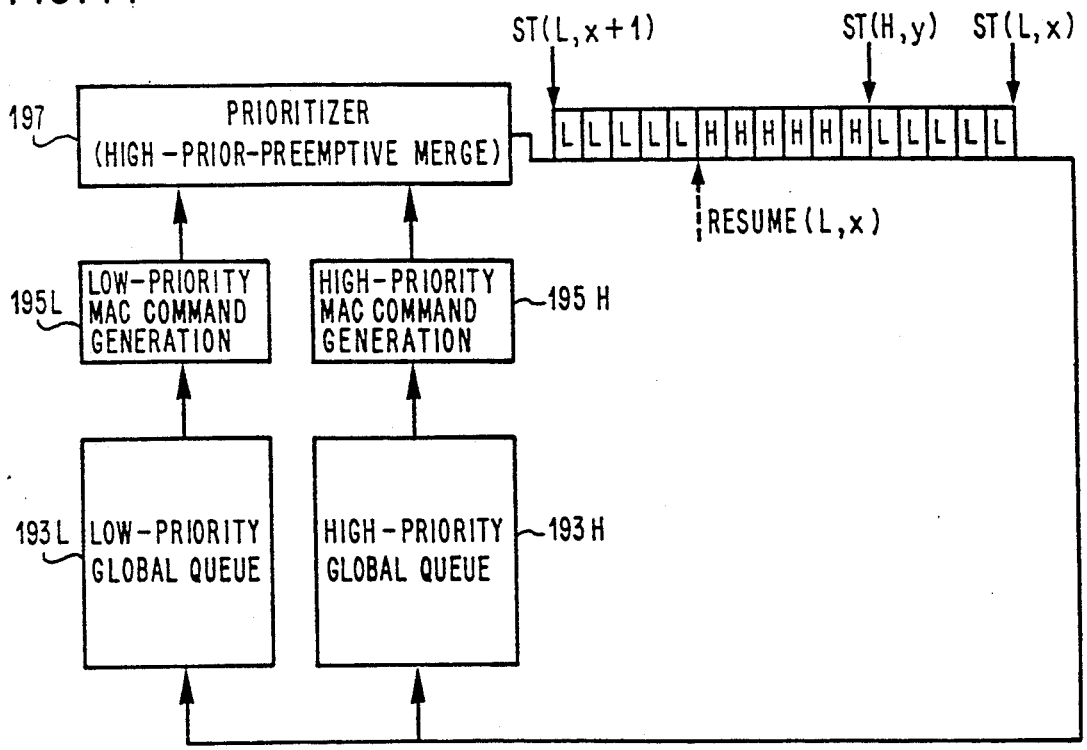

FIGS. 4A-4D schematically illustrate the cyclic reservation and access mechanism of the invention in operation;

FIG. 5 is a sample of a partial slot sequence in different instances;

FIGS. 6A-6H show the format of the medium access commands provided for implementing the invention;

FIG. 7 schematically shows the reservation queue arrangement in a headend unit;

FIG. 8 schematically shows the arrangement of reservation queues in a station;

FIG. 9 illustrates an implementation of different reservation queues in a station by a single RAM and pointer registers;

FIG. 10 Is a block diagram of the medium access circuitry in a station implementing the invention;

FIG. 11 is a block diagram of the circuitry in a headend unit implementing the invention;

FIG. 12 illustrates the dynamics of the backpressure mechanism which can be used with the invention;

FIG. 13 shows some particularities which are necessary for a dual bus system implementing the invention; and FIG. 14 schematically illustrates the priority handling in a system which uses the invention and provides different access priorities.

DETAILED DESCRIPTION

1) Environment System (Basic Network)

Figure 1A:
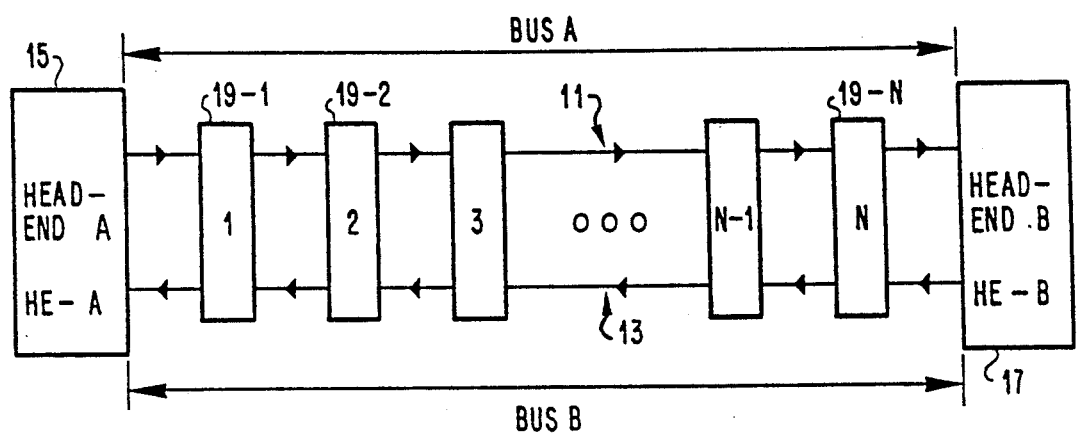
FIG. 1A is a schematic representation of a dual bus network in which the invention can be used.
Figure 1B:
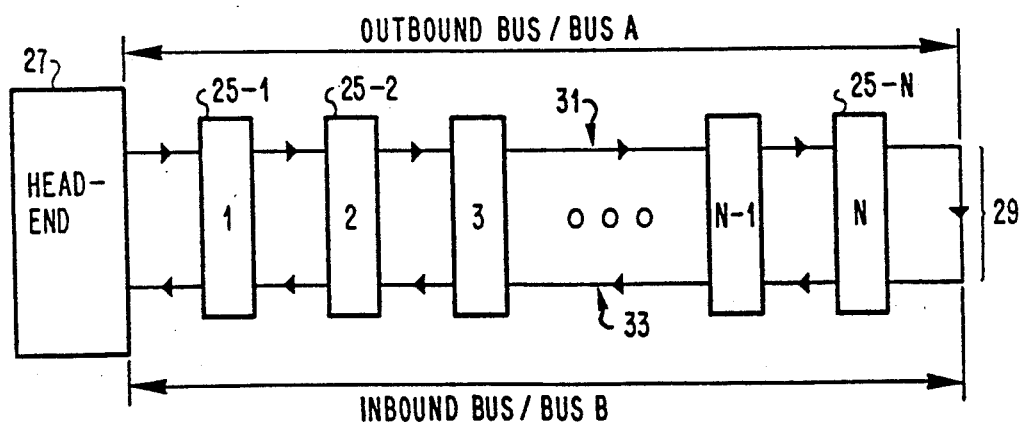
FIG. 1B is a schematic representation of a folded bus network in which the invention can be used.

FIGS. 1A and 1B show two forms of a communications network in which the present invention finds application. Both networks consist of two busses (or bus segments) with a number of stations (nodes) connected between the two busses. Information on each bus is flowing in one direction only, and on the two busses it is counterflowing (antiparallel).

The network of FIG. 1A, referred to as dual bus configuration, comprises two separate busses A (11) and B (13). Two headend units HE-A (15) and HE-B (17) are connected to both busses. Each headend unit releases time slots (explained below) on one bus for use by the stations (19-1, 19-2, ..., 19-N) along the bus for data transmission. A special reservation technique is used for regulating access by the stations to slots on the bus.

The network shown in FIG. 1B, referred to as folded bus configuration, consists essentially of plural stations (25-1, 25-2, ..., 25-N), a single headend unit (27) and a folded bus comprising two bus segments called bus A and bus B, or outbound bus (31) and inbound bus (33), respectively. A fold connection (29) is provided at the last station N for interconnecting the two bus segments. The headend unit is connected to both bus segments for releasing time slots to the outbound bus (A) and receiving returning time slots on the inbound bus (B). As in the dual bus network of FIG. 1A, information on the two bus segments is counterflowing. The same access mechanism can thus also be used on this folded bus system.

For the ease of description, the term "bus" is used in the following for each of the two separate busses of a dual bus system as well as for each of the two bus segments of a folded bus system.

Furthermore, the headend unit is briefly termed "headend", and the node stations are briefly termed "stations" in the following.

In the following, the invention will be explained only in connection with a folded bus system as shown in FIG. 1B, to avoid any complication in the description due to the fact that everything is duplicated on the dual bus system of FIG. 1A (requests on bus A for access to bus B, and requests on bus B for access to bus A). It should be noted however that the invention is also well suited for such dual bus systems, and any modifications necessary will be explained at the end of the specification.

2) Slot Structure

Figure 2:
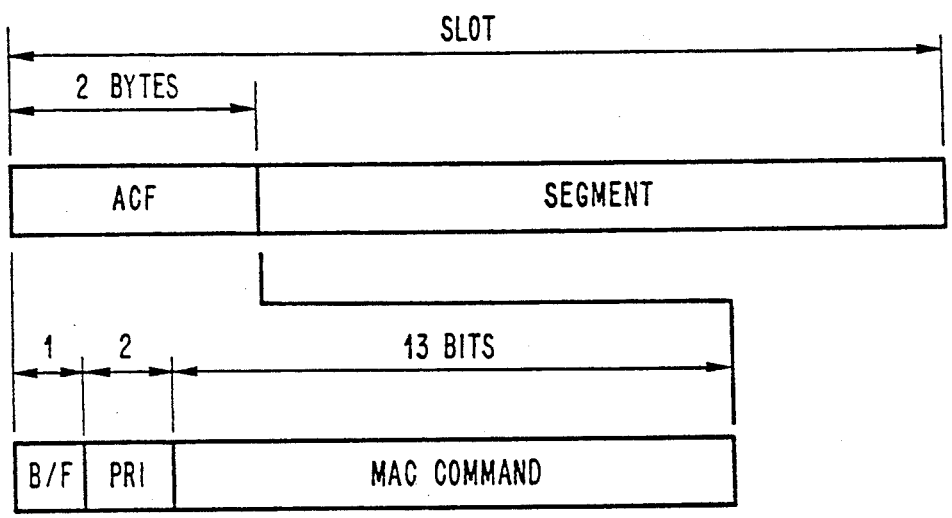
FIG. 2 shows the slot format used in the busses, including the format of access control field information.

FIG. 2 shows the format of the time slots used on the busses for transferring information. These slots are generated continuously by the headend unit. Each slot comprises e.g. 70 bytes and includes an Access Control Field (ACF) and a data segment field (SEGMENT). The information in the segment field may contain, besides the actual data to be transmitted, a header including a destination address and other control information which is specific to the application for which present access mechanism is used. As it is not relevant for the invention, no further details will be given here.

The Access Control Field ACF comprises 2 bytes, i.e. 16 bits. A 1-bit field B/F indicates whether the data segment field already contains data (busy) or is still available (free). A 2-bit priority field (PRI) indicates to which of four priorities the respective slot belongs. The contents of this field is set by the headend unit, indicating the highest priority among outstanding access reservations.

The remaining portion of the ACF carries a 13-bit Medium Access Control (MAC) command. The MAC commands are inserted into generated slots by the headend unit. Various commands can be provided. Those chosen for the present embodiment will be presented in section 4 in connection with FIG. 6.

3) Principles of Invention

Figure 3:
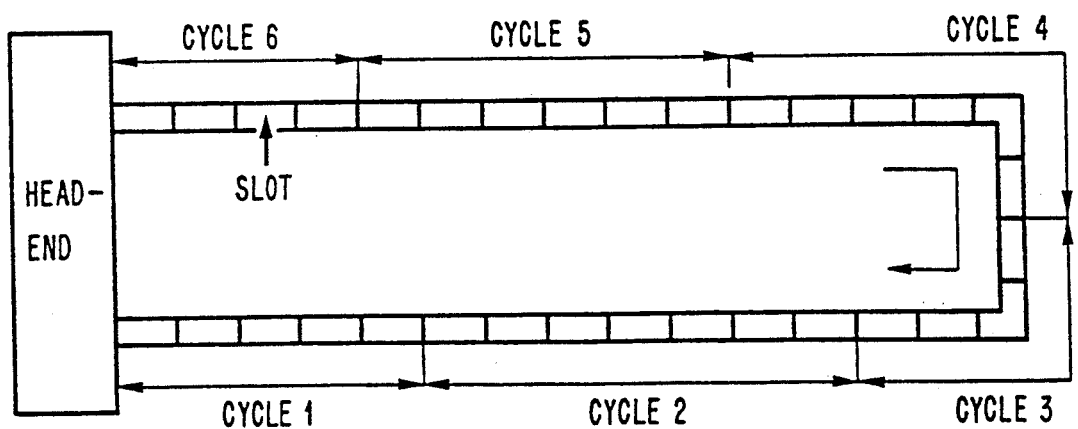
FIG. 3 illustrates the cyclic operation of a bus system using the invention.
Figure 4A:
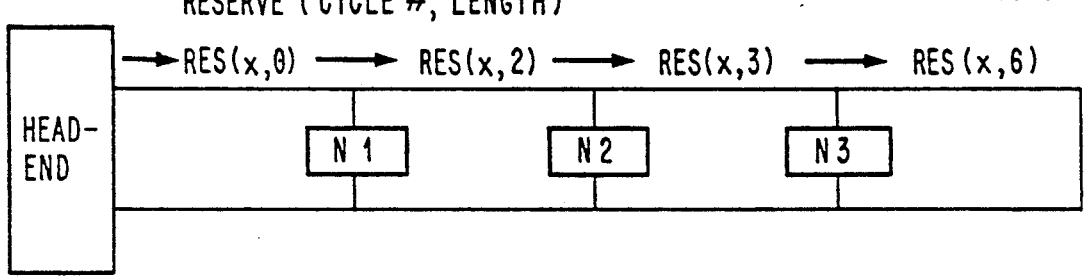
Figure 4B:
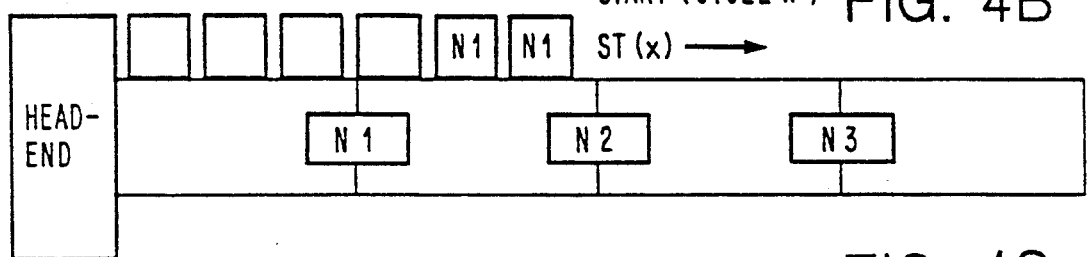
Figure 4C:
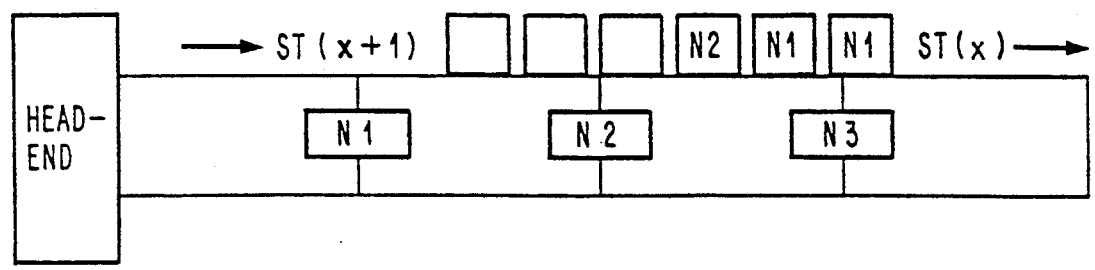
Figure 4D:
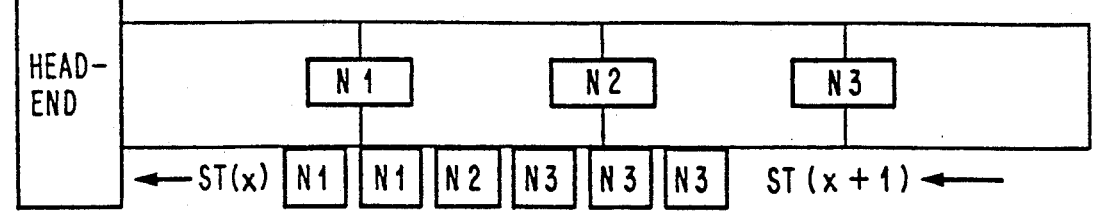

Principal features of the invention are now explained with reference to FIGS. 3, 4, and 5. The basic operation of the cyclic operation of the cyclic reservation multiple access technique requires two MAC commands: A Reserve command and a Start command. As is schematically shown in FIG. 3, the time is subdivided into variable-length cycles, each including an integer number of slots. A cycle is started by a numbered Start command issued by the headend. Prior to starting a cycle with number i, the headend issued a numbered Reserve command for the respective cycle i with a length value (reserved slot count) set to zero. A station which has data to transmit, inserts a request for a sufficient number of slots into the next Reserve command it sees passing on the bus, and records in a local reservation queue the respective cycle number and the count of slots it requested. A request is inserted into a Reserve command by adding a value representing the requested number of slots, to the length value already accumulated in the Reserve command.

FIG. 4 shows for one cycle (x) how the reserve command and the contents of slot segments develop when they propagate along the folded bus. In row A of FIG. 4, the Reserve command is shown in various instances RES (x, n) means Reserve command for cycle x, containing length value n. As can be seen, first the headend unit generates a Reserve command in which the cycle number is set to "x" and the length is set to 0. Assume that station N1 wishes to transmit a 2-segment frame in cycle x. It reserves two slots by incrementing the length argument of the Reserve command. Similarly, stations N2 and N3 increment the length argument by their required amount, which in this example are 1 and 3, respectively. Consequently when the Reserve command returns to the headend, its length argument indicates the total number of 6 slots requested by the stations for cycle x.

Rows B, C, and D of FIG. 4 show a sequence of six slots generated by the headend in response to the Reserve command. These slots are issued between two Start commands ST(x) and ST(x+1). A number (N1, N2, N3) in a slot indicates by which station the respective data segment was inserted into the slot. As can be seen, when cycle x begins, a Start command ST(x) with cycle set to "x" is generated. When a station receives this command, it knows that cycle x starts in the following slot. The station then checks its local reservation queue. If it has a reservation in that cycle, it waits for the first empty slot in the cycle. After setting that slot busy, it transmits the first segment of the frame for which the reservation was made. In the case of a multi-segment frame, as many slots as required (and previously requested) are used to transmit the entire frame. All data segments of one frame are transmitted in contiguous slots (i.e. there will be no intervening slot with a data segment from another station).

In the example considered here as shown in FIG. 4, after start of cycle x, two slots are used by station N1. These are followed by one slot used by station N2, and three slots used by station N3. It is assumed that cycle (x+1) is not empty so that its start follows immediately. (In the folded bus configuration, the stations receive data segments by copying them from slots passing on the inbound bus.)

FIG. 5 shows schematically a partial sequence of slots with MAC commands and data segments on a folded bus. This figure includes the cycle numbers (in circles) which are issued with the Start commands, the cycle numbers (in squares) which are issued with the Reserve commands, and the originating station's identification (with appended cycle number) for the data segment transmitted in any slot. Each Reserve command consists of three parts (RES1, RES2, RES3) as will be explained in the next section.

The headend evaluates each returning Reserve command, and stores in a global reservation queue, together with the respective cycle number, the total accumulated number of slots requested by all stations, as the cycle length value. When respective cycle entry reaches the head of the global reservation queue, the headend issues the numbered Start command and thereafter generates as many (free) slots on the bus as the length value stored in the global queue indicates.

Each station, after seeing a numbered Start command, waits for the first free slot and then uses as many free slots for data transmission as is indicated by the length value which is stored with the respective cycle number in the station's local reservation queue.

There are further commands (such as Confirm and Reject) for regulating the number of outstanding and queued access reservations, and more details will be explained in the following sections.

4) Medium Access Control Commands (MAC Commands)

FIG. 6 shows the formats of the MAC commands used for implementing the invention. There are six MAC commands which are distinguished by a 3-bit OP-code field at the head of each command. Each MAC command further carries a 2-bit field indicating the priority class (PRI) for which the respective command is valid.

The Reserve command (A, B, C) consists of three parts (RES1, RES2, RES3) which are issued in sequence (in three separate slots). The first part RES1 (A) carries the cycle number; the second and third parts (RES2, RES3) carry two 8-bit length fields which together form a 16-bit binary number indicating the total number of slots which are requested for the respective cycle (i.e. the length of the cycle). The number in RES2 (B) constitutes the least significant (LS) portion of the total length value, and the number in RES3 (C) constitutes the most significant (MS) portion of the length value.

The size of the length fields and thus of the MAC commands, and the distribution of the Reserve command into parts is a design issue. It depends on the number of stations in the system, the data segment length of each slot, etc. One could provide a one-part Reserve command of sufficient length to carry all necessary parameters (priority, cycle number, and total length value). The MAC command structure then would be relatively long which is not desirable because many slots do not carry a command at all (NOOP) and the respective transmission capacity would be wasted. Thus, the present solution (three-part Reserve commands each with an 8-bit parameter) was selected as a good compromise.

The Confirm command (D) carries a priority and a cycle number. It indicates to all stations that their reservation for the respective cycle number is accepted and valid (confirmed).

The Start command (E) carries a priority and a cycle number. The slot carrying the Start command is not included in the count of free slots issued for this cycle. This Start command slot is actually the last slot of the previous cycle, and its segment carries the last data segment from that cycle.

The Reject command (F) is provided for implementing a backpressure technique. It has a reserved field for future use. The use of the Reject command is explained in more detail in the next section.

A Recover command (G) is provided for recovering from situations where an event such as a transmission error causes the system to get into an unconsistent state. It carries an action field the contents of which determines the steps each station has to carry out.

Finally, there is a NOOP command (H) which is inserted into any slot that is issued on the bus when no action controlled by a MAC command is required.

5) Headend Queue Architecture

FIG. 7 is a schematic representation of the queues and registers which are provided in the headend unit for implementing the cyclic reservation multiple access technique.

A Global Reservation Queue (GRQ) 41 holds for each non-zero cycle an entry consisting of the respective cycle number and the length of the cycle (number of slots reserved). A Current Cycle Resgister (CCR) 43 holds the number of the current cycle, and the remaining length value for that cycle. For each slot generated by the headend, the length value is decremented by one. Whenever the length value in the Current Cycle Register has become zero, a new entry, if any, is fetched from the Global Reservation Queue, and a Start command with the cycle number of the new entry is issued on the outbound bus.

A Reservation Timer 45 causes at regular intervals the dispatching of a Reserve command. The time interval between successive Reserve commands is determined by the most stringent throughput requirement. It is selected and set at system configuration time. A counter is provided in connection with the Reservation Timer so that a current cycle number can be inserted into each Reserve command. This counter can be reset to an earlier value when a Reject command is issued, as will be explained later.

These units would be sufficient for the basic operation of the cyclic reservation multiple access technique. However, a backpressure mechanism is provided which allows to keep new reservations initially in a tentative state, and to reject (cancel) them in certain situations. This mechanism is used to keep the length of the Global Reservation Queue, in terms of number of reserved slots, below a preselected value which should be as small as possible without causing under-utilization of the transmission medium. This function has both hardware and performance advantages. It results in less hardware, since the required size of the reservation queue is kept to the shortest possible. It results in better performance, since a low-load station with a frame (of data segments) to transmit does not have to wait long before its reservation reaches the head of the queue. The performance of this station is not severely affected by the load offered by other stations. More specifically, the maximum access delay at every station is minimized. The access delay of a frame is defined as time elapsed from when the frame reaches the head of the local data queue until it is actually transmitted.

The backpressure mechanism requires a threshold parameter. This threshold is set to the minimum value for which full network utilization is guaranteed. The minimum value is selected since it minimizes the access delay.

The backpressure threshold BT can be selected as $BT = INT(a) + k$; where $a = d/T$ with $d$ = round-trip delay, and $T$ = slot transmission time; where $INT(a)$ means integer part of $a$; and where $k$ is an implementation-dependent integer about 1 to 3.

A counter 47 is provided for holding a value representing the current number of slot reservations. With each transfer of an entry into the Global Reservation Queue, the contents of counter 47 is increased by the respective length value n. For each slot that is generated by the headend, the counter value is decremented by one. After transfer of a new entry into the Global Reservation Queue, two operations are performed. Firstly, a Confirm command with cycle number is dispatched, indicating to all stations that their reservations for the respective cycle are confirmed. Secondly, the contents of this counter is constantly compared to a threshold value. If the counter contents exceeds a given threshold, a Reject command is issued indicating to all stations that all pending reservations which were not yet confirmed are rejected. The stations will make new reservations for the corresponding frames when the headend resumes to send Reserve commands.

In order to properly handle returning Reject and Reserve commands, the headend unit has an elasticity buffer 49 (EBU). When a Reserve or a Reject command returns, the OP-code, and in the case of a Reserve command, the respective cycle number, and the accumulated reservation value (length) are first inserted into the elasticity buffer. Reservation entries (cycle number with associated length value) are transferred to the Global Reservation Queue through a gate 51 (if that gate is open), at the pace of slots on the outbound bus (i.e. under control of the outbound bus slot clock). Otherwise, i.e. if the gate is closed at transfer time, the respective entry from the elasticity buffer is discarded.

The gate is controlled as follows: When a Reject command is issued (i.e. when the number of slot reservations exceeded the threshold), then the gate is closed. The respective Reject command, when returning to the headend, is entered into the elasticity buffer 49 (only OP-code). When the Reject OP code is read from the top of the elasticity buffer, gate 51 is opened again. This ensures that all reservation entries which are rejected in the stations by the Reject command on its passage along the bus, are also discarded from the elasticity buffer and thus do not enter the Global Reservation Queue.

The headend stops issuing Reserve commands after issuing a Reject command. It records the lowest cycle number for which the Reject command was valid, and when the overload situation has ended, it resumes issuing Reserve commands, starting with that cycle number.

6) Station Queue Architecture

FIG. 8 is a schematic representation of the queues and registers which are provided in each station for implementing the cyclic reservation multiple access technique.

A Confirmed Reservation Queue (CRQ) 53 holds for each cycle an entry consisting of the respective cycle number and the number of slots reserved by the station (length). A Current Cycle Register (CCR) 55 holds the number of the current cycle, and also a length value representing the remaining number of slots reserved for that cycle. When a Start command is received by the station, its cycle number is compared to that in the head of the Confirmed Reservation Queue contains. If there is a match, the entry is then transferred into the Current Cycle Register.

A Tentative Reservation Queue (TRQ) 57 is provided for receiving an entry consisting of cycle number and number of slots reserved (length), when the station has entered a reservation into a passing Reserve command. Whenever a Confirm command is seen by a station, its cycle number is compared to the top entry in the Tentative Reservation Queue 57, and if it matches, this top entry is transferred into the Confirmed Reservation Queue 53.

An Entry/Retry Queue (ERQ) 59 is provided to enable entering of new reservations (requests) and correct handling of rejected reservations. Whenever the station receives a Reject command, all entries of the Tentative Reservation Queue 57 are transferred at once into the top of the Entry/Retry Queue 59.

When a Reserve command arrives at the station and the ERQ is not empty, four operations are performed. Firstly, the length value from the top entry of the ERQ is added to the length value in the Reserve command (for simplicity, this operation is not shown in the figure). Secondly, the cycle number of the Reserve command is entered into the top entry of the ERQ. Thirdly, the top entry of the ERQ is dequeued, and its length value together with the cycle number of the Reserve command is enqueued into the TRQ. Fourthly, if the ERQ becomes empty, then a credit is given to the station higher layer for sending the length of the next frame of data segments (as request for a new reservation).

7) Implementation of Station Queues in RAM with Pointers

The three queues provided in each station, i.e. CRQ, TRQ, and ERQ (FIG. 8) need not be kept in separate storage units. They can be implemented in a single RAM storage, using four pointers as shown in FIG. 9. This is possible because all entries in the three queues once entered remain strictly in the same order.

As can be seen in FIG. 9, for the three queues 53, 57, and 59, there is provided a single random access memory (RAM) 61 and four pointer registers 63, 65, 67, and 69. (The direction of increasing RAM addresses is from top to bottom in the figure.)

The first pointer register 63 contains a pointer CRQ-HEAD-PTR indicating the top position of the Confirmed Reservation Queue. The second register 65 contains a pointer TRQ-HEAD-PTR indicating the top position of the Tentative Reservation Queue. The third register 67 contains a pointer ERQ-HEAD-PTR indicating the top position of the Entry/Retry Queue. The fourth register 69 contains a pointer ERQ-NEXT-PTR indicating the bottom position of the Entry/Retry Queue where the next entry is to be entered.

New entries are only added to the bottom of the existing stored list as indicated by the ERQ-NEXT-PTR. Whenever an entry is to be moved from the top of one queue to the bottom of the next queue, a respective pointer value is increased by one. E.g., for moving an entry from the TRQ to the CRQ, the value in register 65 is increased by one. Thus, no entries have to be moved but only the values in the pointer registers need to be modified.

Initially, when all queues are empty, the values in all four pointer registers are the same. With each new entry, the value in the ERQ-NEXT-PTR register 69 is increased. For moving the whole contents of the Tentative Reservation Queue 57 back into the Entry/Retry Queue 59 (in response to a Reject command), the ERQ-HEAD-PTR pointer register 67 is loaded with the value in the TRQ-HEAD-PTR pointer register 65.

As the queues and the pointers walk through the RAM during operation, usage of the RAM has of course to be cyclically wrapped around (starting again with the lowest address when the highest address was used).

8) Implementation of Cyclic Reservation Multiple Access in a Station

FIG. 10 shows a block diagram of circuitry implementing the functional units required in each station for the cyclic reservation multiple access technique of the invention. This corresponds to the principles shown in FIG. 8 and FIG. 9.

It is assumed that between the stations, information is transferred on busses 31 and 33 in the form of optical signals on optical fibers. In the outbound bus 31, there are an optical-to-electrical converter and decoder 71 and an electrical-to-optical converter and encoder 73, with an electrical bus section 31A between them. In the inbound bus 33, there are an optical-to-electrical converter and decoder 75 and an electrical-to-optical converter and encoder 77, with an electrical bus section 33A between them. Converter 71 provides a clock signal on line 79, and converter 75 provides a clock signal on line 81.

A MAC command decoder 83 is connected to bus 31A and provides on its output lines 85 an identification of the detected MAC command, and on its output lines 87 the parameter contained in any detected MAC command (i.e. a cycle number or a length value). The MAC Command decoder also checks the B/F bit in the ACF of each slot and furnishes a respective "FREE" signal on line 88 to a transmission control unit.

Information provided by MAC command decoder 83 is furnished to Protocol Processor and Pointer Management (PPM) 89 which manages the reservation queues and controls the reservation and access procedures. Its functions are listed below. For the reservation queues, a random access memory (RAM) 91 is provided which corresponds to RAM 61 of FIG. 9.

For modifying the contents of an Access Control Field ACF (Busy/Free indicator and MAC command) in passing slots, a Modify unit 93 is provided in bus 31A. It receives control signals on lines 95 from Transmit Control unit 97 and parameter values on lines 99 from the PPM 89. Transmit Control 97 receives control signals on lines 101 from PPM 89. Information is exchanged between PPM 89 and the queue RAM 91 on lines 103.

For insertion of local data into passing slots, the following units are provided: A data segment buffer 105 receiving data segments from the station on lines 107, and a multiplexer 109 which is inserted in bus 31A and is connected to the data segment buffer 105 by by lines 111. (Data segment buffer 105 is implemented as double buffer for alternating operation, to eliminate dead time and to allow simultaneous read/write.) Under control of signals provided by Transmit Control 101 on lines 113 and 115, a data segment from the buffer 105 can be inserted into the data stream on bus 31A (otherwise, the data stream is passed on unmodified by the multiplexer). The control signal on line 115 is also provided to the station's higher layer for requesting further data when a data segment is transmitted.

A length value provided by the higher layer of the station on lines 117 as access request can be inserted into the queues in RAM 91, and the PPM unit 89 can send a credit signal on line 119 to the station for allowing the furnishing of another access request (in the form of a length value or slot count on lines 117).

The functions of the PPM 89 and Transmit Control 95 are as follows (controlled by the MAC command identification furnished on lines 85 and by the contents of the queues):

In the listing below, "LOC-LENGTH" designates the length value (number of requested slots) which is furnished locally by a station for insertion into a Reserve command; "LS-LENGTH" and "MS-LENGTH" designate the least-significant portion and most-significant portion, respectively of the accumulated length value (number of slots) in a Reserve command.

a) When a Reserve Command (RES1, RES2, RES3) is detected:
   a1) Copy (87) the cycle number from RES1. If the top entry in ERQ (91) is not empty: Insert the cycle number; copy length value and store as LOC-LENGTH; transfer entry from ERQ into TRQ (by changing pointer).
   a2) Copy (87) LS-LENGTH from RES2. Add LOC-LENGTH to LS-LENGTH; insert new LS-LENGTH (99) to RES2; keep carry from LS-LENGTH for MS-LENGTH.
   a3) Copy (87) MS-LENGTH from RES3. Add carry to MS-LENGTH; insert (99) new MS-LENGTH into RES3; send Credit (119) to station's higher layer (if ERQ is empty).
b) When a Start command is detected: Copy (87) cycle number; compare cycle number to top of ERQ (91). If match: Set "Cycle Active" latch.
c) When "Cycle Active" latch is set: For each slot: Check (88) whether free. If free: Send control signals Mux Enable (113) and Send Data (115); set slot BUSY (95); decrement length in top of queue (91). Check whether in top of queue (91), length is zero. If yes: Transfer next entry into top of queue (by changing pointer); reset "Cycle Active" latch.
d) When a Confirm command is detected: Copy (87) cycle number; compare to top of TRQ (91). If match: Transfer entry from TRQ to CRQ (by changing pointer).
e) When a Reject command is detected: Transfer entries from TRQ to top of ERQ (91) (by changing pointer for ERQ head to that of TRQ head).

For receiving data from slots passing on inbound bus 33A, the following units are provided: A Frame Receive Buffer 121 and an Address Decoder 123, both connected to the bus. When the Address Decoder detects the local address of the respective station or a group address including the station (in a segment header as defined for the particular system), it notifies the station's higher layer over line 125 of the arrival of a data segment, and controls the Frame Receive Buffer by a signal on line 127 to receive the data from the segment passing on the bus. This data segment is then available on lines 129 to the station's higher layer.

The various units, in particular converters 71 and 75, receive the clock signals provided on lines 79 and 81 as required.

9) Implementation of Cyclic Reservation Multiple Access in the Headend Unit

FIG. 11 is a block diagram of circuitry implementing the functional units required in the headend for the cyclic reservation multiple access technique of the invention. This corresponds to the principles shown in FIG. 7.

It is assumed that information is transferred on busses 31 and 33 in the form of optical signals on optical fibers to and from the stations. For the outbound bus 31, there is an electrical-to-optical converter and encoder 131, connected to electrical bus section 31A. For the inbound bus 33, there is an optical-to-electrical converter and decoder 133, connected to electrical bus section 33A. Converter 133 provides a clock signal on line 134 (and a separate slot clock signal on line 134A).

A clock generator 135 furnishes on line 136 the system clock for all units of the headend (and a separate slot clock signal on line 136A).

A Slot Generator 137 generates, at regular intervals, the time slots of the format shown in FIG. 2. It receives the information to be inserted into the MAC command field from a MAC command prioritizer 139. This prioritizer is required because different units of the headend generate the different MAC commands, and if two such commands occur simultaneously, a priority selection has to be made (this selection will be explained later).

A Reservation Timer 141 generates at predetermined intervals Reserve commands and furnishes the respective OP-codes on lines 143 and the command parameters (cycle number and length value set to zero) on lines 145 to the MAC command prioritizer 139.

The Reservation Timer contains a timer whose interval can be set to the desired value (at system configuration time) by data furnished on lines 147. To enable stopping of the Reservation Timer and resetting the cycle number to a previous value, this unit receives also the cycle number of each Confirm command, and an inhibiting control signal. Some details will be explained later.

A Cycle generator 149 provides Start commands at appropriate times and furnishes the respective OP-code and cycle number on lines 151 and 153, respectively, to the MAC command prioritizer 139. Essentially, the Cycle generator contains the Current Cycle Register 43 shown in FIG. 7. On a line 155, it receives from the slot generator 137 a control signal each time a slot is generated and transmitted, for decrementing the length value in the current cycle register. When this value becomes zero, a respective indicator signal is furnished on line 157 to the Global Reservation Queue which then transfers its top entry on lines 159 to the Cycle Generator 149 for starting a new cycle.

A storage unit 161 is provided for the Global Reservation Queue (corresponding to the queue 41 in FIG. 7). For controlling queue operations, and for managing the length of the Global Reservation Queue, a Controller unit 163 is provided. Its functions will be explained later in more detail. Global Reservations Queue 161 receives its inputs on lines 165 through gate unit 167 from an Elasticity Buffer 169 (which corresponds to the elasticity buffer 49 in FIG. 7). Each entry transferred into the GRQ 161, i.e. the cycle number and the length value, is also transferred on lines 165 into the Controller unit 163. Gate 167 can be closed by a Reject control signal on line 171 from Controller unit 163, and it can be opened by a control signal on lines 173 from the elasticity buffer 169, which is activated when a Reject command OP-code appears in the top entry. The gate unit 167 receives the slot clock signal on lines 136A, to enable the transfer of any entry from the elasticity buffer into the Global Reservation Queue at each slot time.

The control signal on line 173 (Reject OP code detected) is also furnished to Controller 163.

A MAC command decoder 175 and an Assemble Register 177 are connected to inbound bus section 33A, for receiving the contents of MAC commands carried in returning slots. When either one of the three Reserve command parts or a Reject command are detected by the MAC command decoder, a respective coded indication is transferred on lines 179 to the Assemble Register.

The Assemble Register 177, under control of the MAC command indicator signals, accumulates from each sequence of three consecutive Reserve command parts (RES1, RES2, RES3), the cycle number and the two length values into a single entry which is then transferred into the Elasticity Buffer 169. When a Reject command is received, the Assemble Register only extracts the OP code and transfers it as one entry into the Elasticity Buffer 169.

Controller unit 163 causes generation of a Confirm command by furnishing the respective OP code on lines 185 and a cycle number on lines 187 to the MAC command prioritizer 139 when an entry is transferred from the elasticity buffer into the Global Reservation Queue. The Confirm cycle number is also provided on lines 187 to the Reservation timer 141. As already mentioned, the Controller unit activates a reject control signal on lines 171 when a Reject command is to be issued. This signal is furnished to the gate 165 for closing it. Simultaneously with this signal, the Reject command OP code is furnished on lines 189 to the MAC command prioritizer 139 to cause insertion of a MAC command into the next possible slot. Also simultaneously, an inhibiting signal on line 191 is activated and furnished to the Reservation Timer 141 for stopping it. When the number of outstanding slot reservations goes below the threshold, Controller 163 deactivates the inhibit signal on line 191 to the Reservation Timer, enabling it to resume its operation.

In the following, some more details are given on the functions and operation of the MAC Command Prioritizer 139, the Reservation Timer 141, and the Controller 163.

The MAC Command Prioritizer 139 intermediately stores each command OP-code it receives, together with the associated parameter, and forwards them to the Slot Generator 137 with the following priorities (listed from high priority to low priority): 1) Start commands—2) Confirm commands—3) Reject commands—4) Reserve commands. As a Reserve command always is generated in three parts (RES1, RES2, RES3), it may be interrupted by intervening Start, Confirm, or Reject commands. If this is not desirable, the following rule can be implemented: After transmission of the first part (RES1) of a Reserve command, the second (RES2) and third (RES3) part are always transmitted immediately in sequence, regardless of the arrival of any other command.

The Reservation Timer 141 has its own timer and a cycle counter which is increased by one for each Reserve command issued. Furthermore it executes the following functions: It retains in a register the cycle number of the last issued Confirm command (which it receives on lines 187); upon activation of the inhibit control signal on line 191, it stops its timer, and resets the value in its cycle counter to one more than the stored cycle number of the last Confirm command. Upon deactivation of the inhibit control signal (191), it restarts its timer.

Controller 163 essentially includes the following means: A counter for holding the remaining accumulated reservation count (corresponds to 47 in FIG. 7); a register/generator each for furnishing the Confirm OP-code and the Reject OP-code; a register for holding and transferring the number of the last confirmed cycle plus one; a register for holding the threshold value b; and a comparator for comparing the count (remaining length or number of reserved slots) with the threshold.

The following functions are executed by Controller 163 in response to the various control and status information it receives:

a) Keep a count (47) of the remaining number of slot reservations; increase the count by the number (165) of slot reservations transferred to the GRQ; decrease the count by one for each slot generated (155) by the headend unit.

b) After each increase of the count: Transfer the confirmed cycle number (187) to the MAC command prioritizer and to the reservation timer; send a Confirm command OP code (185) to the MAC command prioritizer.

c) Keep the threshold value for the length of the GRQ; compare the count to the threshold after each count increase. If threshold exceeded: Send a reject/-close notification (171) to the gate between buffer and GRQ; send a Reject command OP code (189) to the MAC command prioritizer; activate an inhibit signal (191) to the Reservation Timer.

d) Upon a "Reject command received" indication (173) deactivate the inhibit signal (191) to the Reservation Timer.

10) Overview of Backpressure Mechanism

FIG. 12 illustrates the dynamics of the backpressure mechanism. At the top of the figure, the arrows represent MAC commands issued by the headend unit: Ri, Ci, and Si represent Reserve, Confirm and Start commands for cycle i, respectively; and RJ represents the Reject command. At the bottom of the figure, the returning MAC commands are shown. The lowest row shows the commands when arriving at the headend and entering the elasticity buffer; the row above shows the commands being transferred from the elasticity buffer into the Global Reservation Queue GRQ. The staircase diagram represents the numbers of confirmed reservations in the GRQ and remaining ones in the CCR. The line at b=10 represents the backpressure threshold (the value 10 is only an example).

It is assumed that at the beginning of the diagram, Reserve commands for cycles 1, 2, and 3 were issued an are propagating on the bus. First, R1 returns with a length of four and is passed through the buffer into the GRQ. At this moment the confirmation C1 is issued, and at the next slot time, the start S1 is issued already. Four reservations are outstanding, which are decremented by one for each slot generated. In the meantime, Reserve command R4 is issued. Then, R2 returns and is entered through the buffer into the GRQ, raising its contents to 14 (remaining 2 plus new 12). This exceeds the threshold. Therefore, after sending Confirm command C2, the headend issues a Reject command in the next slot time. The gate between elasticity buffer and GRQ is immediately closed, as indicated by the solid line between the bottom rows of the figure. Thus, R3 and R4, when returning to the headend, are inserted into the elasticity buffer but not transferred into the GRQ. Only when the RJ command returns, it opens the gate again such that reservations which arrive later, can be transferred into the GRQ.

When the total number of remaining slot reservation goes below the threshold, the headend can resume to issue Reserve commands, starting from the number after the last cycle which was confirmed. As the last confirm command was C2, the next Reserve command should be for cycle 3. This is indicated by the command R3' which is issued when the total reservation number falls below the threshold. Thereafter, at the regular reservation interval, further Reserve commands are issued; R4' is a repeated one, but R5 and R6 are new ones. As can be seen, when R3' and later R4' arrive at the elasticity buffer, they are normally inserted and can later be transferred to the GRQ. Confirmation commands C3 and C4, and subsequent Start commands S3 and S4 are issued at appropriate times.

This shows that the number of slot reservations in the GRQ plus those in the CCR can surpass the threshold at most by one maximum cycle length.

11) Modifications for Dual Bus Configuration

The description so far was for a folded bus system having only one headend unit which receives back the MAC commands it issued. For the dual bus system (as was shown in FIG. 1A), some modifications are necessary which will be schematically described with reference to FIG. 13.

Access to bus A is shown at the upper portion (A) of the figure. Headend unit HE-A generates the empty slots for data transmission on bus A. Data inserted on bus A must also be received from bus A because the slots do not return on the other bus. HE-A also issues the Confirm, Start, and Reject commands for cycles on bus A. Further, it keeps the Global Reservation Queue for access requests to bus A. However, the Reserve commands for access to bus A must travel in the counter direction on bus B, and therefore they are issued by headend unit HE-B. This is a service which HE-B does for HE-A. Without backpressure mechanism, this would be all that is required because the servicing headend HE-B need not know about the status of the Global Reservation Queue in HE-A and about data transmissions on bus A.

When the backpressure mechanism and thus Reject commands are used, some Reserve commands must be repeated after a reject situation, and therefore HE-B must have some information about the status of reservations in the GRQ of HE-A. This is handled as follows:

HE-B has means for recognizing Confirm commands from HE-A, and for storing the latest confirmed cycle number. It has further means for recognizing a Reject command from HE-A, and for inserting into the counter of its Reservation Timer (which is used for issuing the Reserve commands), the latest-confirmed-cycle number plus one. It also sends the Reject command with a special marking (e.g. in the reserved field) back on bus B for usage by the stations. The marking would be necessary to enable HE-A to distinguish between own returning Reject commands and original Reject commands issued by HE-B. Thereafter, Reservation commands are just issued starting with the lower number, which means HE-B only backs up, upon receiving a Reject command, from its current to a previous cycle number.

The lower portion (B) of FIG. 13 shows the situation for transmissions on bus B, where all the functions are exchanged, i.e. reservations are made on bus A, and HE-A issues the Reserve commands as a service for HE-B.

12) Priority Handling

The description given so far was for a single priority level. However, plural priorty levels can be provided, as was discussed in connection with the slot format (FIG. 2). For each priorty level, the queues and associated circuitry (Reservation Timer, etc.) have to be duplicated. The slot generator and the MAC command prioritizer, however, would be provided only once. Whenever a MAC command of higher priority has to be issued, it has preemptive priority over lower priority commands. Furthermore, a cycle of slots for a lower priority is interrupted in favour of the starting of a cycle of slots for a higher priority.

The situation is illustrated in FIG. 14 for the example of only two different priorities. There are shown two Global Reservation Queues 193L and 193H for the low and high priority, respectively. There are also shown functions Low Priority MAC Command Generation 195L and High Priority MAC Command Generation 195H, respectively. These represent all the units shown in FIG. 11 which can generate MAC commands, and which are duplicated for each priority. The function of the MAC command prioritizer is shown at 197. It has the additional function (besides regulating priorities among different MAC commands of the same priority level) of merging the MAC commands of different priority levels on a priority-preemptive basis.

A resulting sequence of slots is shown at the output of the prioritizer 197. First, a Start command ST(L, x) was issued for the x-th cycle of the low priority. A few of the slots for this cycle and priority level are issued. Then a Start command ST(H,y) occurs for the y-th cycle of the higher priority. The issuing of slots for the lower priority is immediately interrupted (however, the remaining length for the current cycle (L, x) is kept in the respective register). The start command for the higher priority is issued, and all the necessary empty slots for cycle y of the higher priority follow. Thereafter, generation of empty slots for the lower priority is resumed and the remaining number of slots is issued. Then, if no cycle for the higher priority is needed, the next Start command for the lower priority level, ST(L, x+1) is issued, followed by empty slots for that cycle.

13) Further Modifications

Headend Function in Node Station:

For FIGS. 1A, 1B and 13A, 13B and the associated descriptions it was assumed that the function of the headend unit is provided in a separate device, and that each station is only a user of the system. It is possible to combine the function of the headend unit and that of a user station in one device, such that no separate devices for the headend units are required. Furthermore, it is even possible to provide the means required for the functions of a headend unit, in each of the station devices. Though this is a redundant solution, it enables a reconfiguration of the network at any time, i.e. the system could be operated in separate sections, or failing sections which include a headend can be separated from the network but the remainder of the system can still be operated.

Compact Issuing of MAC Commands:

In the examples of slot format (FIG. 2) and slot sequence (FIG. 5) it was shown that each slot carries an ACF field with space for a MAC command. A possible alternative which also allows to use the invention, is to provide data slots including (besides the data segment field) only B/F and priority fields, and separate control slots for MAC commands. In such a case, a sequence of data slots would be followed by a single control slot carrying one or several MAC commands. The control slot could either have the same size as the data slots, or it could be a minislot which is much shorter than a data slot.

This solution offers an advantage if in a particular system the average number of MAC commands is small as compared to the total number of slots generated. In other words, this solution can eliminate the transmission of numerous NOOP commands which actually carry no useful information.

We claim:

1. Method of regulating access to a communications network, said network comprising two unidirectional counterflowing transmission busses, a plurality of stations each connected to both busses, and at least one headend unit for generating time slots on said busses at regular intervals; said method comprising the following steps:

issuing regularly, for consecutive cycles, reservation commands on said busses, each reservation command comprising a sequential cycle number and initially a zero reservation count;

augmenting, by each station, said reservation count by a request count representing a number of slot requests for data pending transmission in the respective station;

storing, in each station, in a local reservation queue each request count which was used to augment a reservation count and the cycle number of the respective reservation command;

storing, for each reservation command that has passed all stations, in a global reservation queue the cycle number and the associated accumulated reservation count which was contained in that reservation command;

issuing, for each one of said consecutive cycles, a cycle start command containing a respective cycle number, and releasing subsequently a sequence of free slots whose number is equal to the stored accumulated reservation count in the global reservation queue for the respective cycle number; and in each station, after detecting a start command with its cycle number, accessing r free slots for data transmission, r being the request count stored with the respective cycle number in the local reservation queue of the respective station.

2. Method in accordance with claim 1, said two busses being the outbound bus and the inbound bus of a folded bus configuration, a single headend station being provided which is connected to the outbound bus and the inbound bus, said method further comprising the following steps:

said headend unit releasing slots on said outbound bus for circulation along the folded bus network;

said headend unit issuing said reservation commands on said outbound bus in slots, and receiving returning reservation commands on said inbound bus; and said global reservation queue being stored in said single headend unit.

3. Method in accordance with claim 1, said network being a dual bus system comprising a first bus and a second bus and comprising a first headend unit and a second headend unit, each headend unit being connected to both busses, said first bus being an outbound bus for the first headend unit and an inbound bus for the second headend unit, and said second bus being an inbound bus for the first headend unit and an outbound bus for the second headend unit; said method further comprising the following steps:

in each headend unit, releasing on its outbound bus said time slots, and said reservation commands each as a portion of a slot, and receiving on its inbound bus, each said reservation command released by the other headend unit, and storing in a global reservation queue as reservations for slots on its outbound bus, the cycle number and accumulated reservation count from each received reservation command; and in each station, providing two local reservation queues, each assigned to one of said busses, augmenting by a request count representing a number of slots required for data pending transmission, a reservation count in a reservation command on said first bus for access to slots on said second bus, and a reservation count in a reservation command on said second bus for access to slots on said first bus, and inserting each request count, which was used to augment a reservation count in a reservation command on the first bus or second bus, respectively, together with the associated cycle number into the local reservation queue assigned to the second bus or first bus, respectively.

4. Method in accordance with claim 1, further comprising the following steps:

in each said headend unit issuing a confirmation command containing a cycle number of a received reservation command when the accumulated reservation count of the received reservation command can be accepted and stored in a global reservation queue in said headend unit, and issuing a reject command when the accumulated reservation count of a received reservation command cannot be accepted, and in each said station maintaining a tentative reservation queue and a confirmed reservation queue together constituting said local reservation queue, entering each said request count first into said tentative reservation queue, upon receiving a confirmation command with its cycle number, transferring the entry with the respective cycle number from the tentative reservation queue into the confirmed reservation queue, and upon receiving a reject command, deleting all entries from said tentative reservation queue.

5. method in accordance with claim 4, further comprising the following steps for each station:

maintaining an entry/retry queue for rejected reservation, and upon receiving a reject command, transferring all entries from said tentative reservation queue into said entry/retry queue.

6. Method in accordance with claim 1, further comprising the following steps:

issuing each said reservation command in a plurality of parts (RES1, RES2, RES3), each part being transmitted in a separated slot, the first part (RES1) of each reservation command comprising, besides an identification of this first part the respective cycle number for which the reservation command is issued, the second (RES2) and further (RES3) parts of each reservation command each comprising, besides an identification of the respective part, at least a portion (MS; LS) of the reservation count to be carried by the respective reservation command.

7. Method in accordance with claim 1, for a system providing a plurality of access priority levels, said method comprising the following additional steps:

issuing for each of said priority levels, separate time slots and separate reservation commands and cycle start commands, each carrying a respective priority indication, and maintaining each said local reservation queue and each said global reservation queue in as many copies as the system provides priority levels, such that a cyclic multiple access reservation procedure can be separately exercised for each one of said priority levels.

8. Method of regulating access to a communications network, said network comprising two unidirectional counterflowing transmission busses, a plurality of stations each connected to both busses, and at least one headend unit for generating consecutive time slots on said busses; said method comprising the following steps:

releasing regularly, for each one of plural consecutive cycles, a reservation command comprising a sequential cycle number and a reservation count which is initially zero;

augmenting, by each station, said reservation count by request count representing a number of a slot requests for data frame pending transmission in the respective station;

maintaining in each station a tentative request queue and a confirmed request queue;

storing in each station each requested count which was used to augment a reservation count and the corresponding cycle number in said tentative request queue;

for each reservation command that has passed all stations, either storing said cycle number and the associated accumulated reservation count in global reservation queue, and issuing a confirmation command with the respective cycle number, or issuing a reject command indicting that the accumulated reservation count is not accepted;

in each station, upon receiving a confirmation command with its cycle number, transferring an entry containing the respective cycle number, and the associated reservation count from the tentative request queue to the confirmed request queue; and In each station, upon receiving a reject command, deleting all entries containing a cycle number and associated requested count from the tentative requested queue.

9. Method in accordance with claim 8, said two busses being the outbound bus and the inbound bus of a folded bus configuration, a single headend station being provided which is connected to the outbound bus and the inbound bus, said method further comprising the following steps:

said headend unit releasing slots on said outbound bus for circulation along the folded bus network;

said headend unit issuing said reservation commands on said outbound bus in slots, and receiving returning reservation commands on said inbound bus; and said global reservation queue being stored in said single headend unit.

10. Method in accordance with claim 8, said network being a dual bus system comprising a first bus and a second bus comprising a first headend unit and a second headend unit, each headend unit being connected to both busses, said first bus being an outbound bus for the first headend unit and an inbound bus for the second headend unit, and said second bus being and inbound bus for the first headend unit and an outbound bus for the second headend unit; said method further comprising the following steps:

in each headend unit, releasing on its outbound bus said time slots, and said reservation commands each inserted in a slot, and receiving on its inbound bus, each said reservation command release by the other headend unit, and storing in a global reservation queue as reservations for slots on its outbound bus, the cycle number and accumulated reservation count from each received reservation command; and in each station, providing two confirmed reservation queues and two tentative reservation queues, a first confirmed reservation queue and a first tentative reservation queue being aligned to said first bus, and a second confirmed reservation queue and a second tentative reservation queue being assigned to said second bus, augmenting by a request count representing a number of slots required for data pending transmission, a reservation count in a reservation command on said first but access to slots on said second bus, and a reservation count in a reservation command on said second bus for access to slots on said first bus, and inserting each request count which was used to augment a reservation count in a reservation command on the first or second bus, respectively, together with the associated cycle number into the tentative reservation queue assigned to the second bus, respectively.

11. Method in accordance with claim 8, further comprising the following steps for each station:

maintaining an entry/retry queue for rejected request counts and new request counts, upon receiving a reject command, transferring all entries from said tentative reservation queue to the top of said entry/retry queue, entering each newly received request count into entry/retry queue, and upon receiving a reservation command, augmenting its reservation count by the request count of the top entry in the entry/retry queue, and then transferring the latter to the tentative reservation queue.

12. Method in accordance with claim 8, further comprising the following steps for each headend unit:

maintaining a global reservation queue for entering cycle number and accumulated reservation count of each received reservation command;

initially holding each new entry for the global reservation queue of said headend unit, in an elasticity buffer, transferring an entry from said elasticity buffer into said global reservation queue prior to issuing a confirmation command for the respective cycle, and when issuing a reject command, cancelling all entries from said elasticity buffer.

13. Method in accordance with claim 12, further comprising the following steps for each headend unit:

maintaining a remainder count of slot reservations confirmed and not yet served, comparing the value of said remainder count to predetermined threshold value at least after each increase of said remainder count, and issuing said reject command when said reminder count exceeds said threshold.

14. In a communications network comprising two unidirectional counterflowing transmission busses, a plurality of stations each connected to both busses, and at least one headend unit for generating time slots on said busses; in which network each station requested slot access by amending the contents of a passing reservation field, and keeps a record of pending access requests;

apparatus for handling multiple access requests, said apparatus comprising:

a) in each headend unit:

means (139, 141) for releasing regularly reservation commands each with a sequential cycle number and a reservation count being set to zero;

a global reservation queue (41; 161) for storing in sequential order, in each position a cycle number and an associated reservation count;

means (49, 51; 165, 167, 169, 177) for receiving reservation commands, and for transferring the cycle number and an accumulated reservation count from each received reservation command into one position of said global reservation queue; and means (137, 149, 163) for releasing start commands each with sequential cycle number, and for releasing after each start command a number of free slots which is equal to the reservation count stored in the global reservation queue with the respective cycle number;

b) in each said station:

a local reservation queue (53, 57; 91) for storing in sequential order, in each position, a cycle number and an associated, locally requested slot count;

means (83, 87, 89, 93, 99, 103) for extracting a cycle number from a reservation command propagating on the bus and for augmenting by a locally requested slot count, the reservation count in the same reservation command;

means (89, 103, 117) for inserting an extracted cycle number and a locally requested slot count, together into position of said local reservation queue; and means (89, 95, 97, 101, 103, 105, 109, 113, 115) for comparing a cycle number in a start command propagating on a bus, with the cycle number in a position of said local reservation queue, and for transmitting data in as many free slots propagating on the bus as are indicated by the slot count value in a position storing a matching cycle number.

15. Apparatus in accordance with claim 14, in which said two busses are the outbound bus (31) and the inbound bus (33) of a folded bus configuration, and a single headend station (27) is provided which is connected to the outbound bus and the inbound bus.

16. Apparatus in accordance with claim 14, in which said network is a dual bus system comprising a first bus (11) and a second bus (13) and comprising a first headend unit (15) and a second headend unit (17), each headend unit being connected to both busses, said first bus being an outbound bus for the first headend unit and an inbound bus for the second headend unit and an outbound bus for the second headend unit;

said apparatus further comprising:

a first set of medium access means and a second set of medium access means, each set comprising a said local reservation queue, a said extracting and augmenting means, a said inserting means, and a said comparing and transmission means;

said first set of medium access means being associated with said first bus (11), and said second set of medium access means being associated with said second bus (13).

17. Apparatus in accordance with claim 14, further comprising:

in each said headend unit, an elasticity buffer (49) for receiving and keeping an accumulated reservation count and associated cycle number prior to entering them into said global reservation queue (41);

means for issuing a confirmation command with a cycle number when an entry with a respective cycle number is transferred from said elasticity buffer (49) into said global reservation queue (41), means (47) for keeping a number of globally pending slot reservations and for comparing it to a threshold, and for issuing a reject command when said threshold is surpassed; and in each said station, a tentative reservation queue (57) and a confirmed reservation quene (53) forming together said local reservation queue, means for first entering a new entry for said local reservation queue into said tentative reservation queue (57), means detecting a confirmation command and its cycle number, and for transferring an entry with the respective cycle number from the tentative reservation queue (57) into the confirmed reservation queue (53) upon detection of a confirmation command, and means for detecting a reject command, and for deleting all entries from said tentative reservation queue (57) upon detection of a reject command.

18. Apparatus in accordance with claim 17, further comprising:

a retry queue (59) for receiving entries deleted from said tentative reservation queue (57), and means for individually transferring an entry from said retry queue (59) back into said tentative reservation queue (57) upon each occurrence of a reservation command.

19. Apparatus in accordance with claim 14, for a system providing a plurality of access priority levels, said apparatus comprising:

each said queues in each said headend unit and in each said station, in as many copies as the system provides priority levels, and priority selection means (197) in each said headend unit, for selecting the priority level to be served, such that a cyclic multiple access reservation prodcedure can be separately exercised for each one of said priority levels.

20. Apparatus in accordance with claim 14, in which at least one headend unit is combined with a station, such that information transferred from said headend unti is first transferred to said combined station before being transmitted via said bus to the other stations.

21. An apparatus for providing access to multiple stations in communications network having undirectional counterflowing transmission busses coupled to each of the multiple stations and at least one headend unit for controlling access to the transmission busses, said apparatus comprising:

means, in said at least one headend unit, for releasing on one of said busses at selected intervals reservation commands, each with a cycle number and a predetermined reservation count;
  a global reservation queue for storing in sequential order, in each position a cycle number and an associated reservation count;
  means for receiving from another of said busses reservation commands and for transferring the cycle number and accumulated reservation count including the predetermined reservation count from each received reservation command into one position of said global reservation queue; and
  means for releasing start commands each with a sequential cycle number, and for releasing after each start command a number of free slots which are equal to the accumulated reservation count stored in the global reservation queue with the respective cycle number.

22. An apparatus for providing access to multiple stations in a communications network having unidirectional counterflowing transmission busses couple to each of the multiple stations and at least one headend unit for controlling access to the transmission busses, said apparatus comprising:

in each said station;
  a local reservation queue for storing in sequential order, in each position, a cycle number and an associated locally requested slot count;
  means for extracting cycle numbers from reservation commands propagating on one of said undirectional counter-flowing transmission busses and for augmenting reservation counts in said reservation command with locally requested slot counts;
  means for inserting an extracted cycle number and a locally requested slot count into a position of said local reservation queue; and
  means for comparing a cycle number in a start command propagating on said one of said unidirectional counterflowing transmission busses with the cycle number in a position of said local reservation queue and transmitting data in as many free slots propagating on the one of said unidirectional counterflowing transmission busses as are indicated by the slot count value in a position storing a matching cycle number.

23. Method of regulating access to a communications network, said network comprising two unidirectional counterflowing transmission busses, a plurality of the stations each connected to both busses, and at least one headend unit for generating time slots on said busses at regular intervals; said method comprising the following steps:

(a) releasing from said at lease one headend unit, on one of the two unidirectional counterflowing transmission busses, at selected intervals, reservation commands, with each command having a cycle number and a predetermined reservation count;
  (b) providing a global reservation queue for storing in sequential order in each position a cycle number and an associated reservation count;
  (c) receiving, from another one of the two unidirectional counterflowing transmission busses reservation commands, with each reservation command includng a cycle number and an accumulated reservation count including the predetermined reservation count of step (a);
  (d) transferring the cycle number and accumulated reservation count into one position of the gobal reservation queue; and
  (e) for each entry in said global reservation game releasing a start command with the cycle number of said entry followed by a number of free slots equal to the numbers of accumulated reservation count for the entry.

24. Method of regulating access to a communications network, said network comprising two unidirectional counterflowing transmission busses, a plurality of stations each connected to both busses, and at least one headend unit for generating time slots on said busses at regular intervals; said method comprising the following steps:

(a) providing, in each station, a local reservation queue for storing in sequential order in each position a cycle number ansd an associated locally associated slot count;
  (b) monitoring one of said two unidirectional counterflowing transmission busses to extract reservation commands propagating thereon;
  (c) for each extracted reservation command, augmenting a reservation count in said each extracted reservation command with a locally slot count and extracting a cycle number;
  (d) inserting the extracted cycle number and the locally requested slot count into a position of said local reservation queue;
  (e) monitoring the ones of said two unidirectional counterflowing transmission busses to extract start commands propagating thereon; and
  (f) for each extracted start command, comparing cycle numbers in said start command with cycle numbers in positions of said local reservation queue and for each match between cycle numbers transmit data in as many free slots propagating on the one of said two unidirectional counterflowing transmission busses as are indicated by the slot count value in a position storing a matching cycle number.

* * * * *